United States Patent
Parker

(10) Patent No.: US 8,967,551 B2
(45) Date of Patent: Mar. 3, 2015

(54) SLAT MONITORING SYSTEM

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 82 days.

(21) Appl. No.: 13/583,662

(22) PCT Filed: Mar. 4, 2011

(86) PCT No.: PCT/GB2011/050423
§ 371 (c)(1),
(2), (4) Date: Sep. 10, 2012

(87) PCT Pub. No.: WO2011/110833
PCT Pub. Date: Sep. 15, 2011

(65) Prior Publication Data
US 2012/0325976 A1    Dec. 27, 2012

(30) Foreign Application Priority Data

Mar. 10, 2010  (GB) .................................. 1004026.9
May 7, 2010   (GB) .................................. 1007632.1

(51) Int. Cl.
*B64C 3/50*    (2006.01)
*B64C 9/22*    (2006.01)
*B64D 45/00*   (2006.01)

(52) U.S. Cl.
CPC .............. *B64C 9/22* (2013.01); *B64D 45/0005* (2013.01); *B64D 2045/001* (2013.01)
USPC ............ 244/214; 244/213; 244/203; 244/215

(58) Field of Classification Search
CPC ........................ B64D 2045/001; B64D 45/0005
USPC ........... 244/213, 214, 203, 194, 215; 701/8, 9
See application file for complete search history.

(56) References Cited

U.S. PATENT DOCUMENTS 2,995,705 A * 8/1961 Walker et al. ................. 324/175
3,628,038 A * 12/1971 Culver et al. ................. 250/233
(Continued)

FOREIGN PATENT DOCUMENTS

| EP | 1 955 947 | 8/2008 |
| GB | 2 162 949 | 2/1986 |

(Continued)

OTHER PUBLICATIONS

International Search Report for PCT/GB2011/050423, mailed Jun. 7, 2011.
(Continued)

*Primary Examiner* — Benjamin P Lee
*Assistant Examiner* — Alexander V Giczy
(74) *Attorney, Agent, or Firm* — Nixon & Vanderhye P.C.

(57) ABSTRACT

A system and method for determining whether the relative rate of deployment of all the slats extending from a leading edge of an aircraft wing is the same as a predetermined relative rate of deployment. Each slat includes at least one slat deployment mechanism that includes a drive pinion drivingly coupled to each slat and a rotary actuator having an output shaft driven by a common input drive shaft. The system of the invention comprises a sensor associated with each rotary actuator to generate a signal indicative of the rate of rotation of the corresponding output shaft and to supply that signal to a controller. The controller is configured to analyze the signals supplied by the sensors and to generate an alarm signal if a relative rate of rotation of any of the output shafts differs from a predetermined relative rate of rotation.

21 Claims, 7 Drawing Sheets

(56) References Cited

U.S. PATENT DOCUMENTS

| | | | |
|---|---|---|---|
| 4,370,706 A * | 1/1983 | Doniger et al. | 700/79 |
| 4,387,299 A * | 6/1983 | Akiyama | 250/231.14 |
| 4,441,675 A * | 4/1984 | Boehringer et al. | 244/213 |
| 4,476,567 A | 10/1984 | Johnson | |
| 4,639,595 A * | 1/1987 | Okita et al. | 250/231.14 |
| 4,838,503 A * | 6/1989 | Williams | 244/214 |
| 5,107,107 A * | 4/1992 | Osborne | 250/231.14 |
| 5,686,907 A | 11/1997 | Bedell et al. | |
| 5,719,566 A * | 2/1998 | Readman et al. | 340/945 |
| 5,880,367 A * | 3/1999 | Vaughn | 73/488 |
| 6,374,664 B1 * | 4/2002 | Bauer et al. | 73/117.02 |
| 6,382,566 B1 | 5/2002 | Ferrel et al. | |
| 6,483,105 B2 * | 11/2002 | McAllister et al. | 250/231.13 |
| 6,739,550 B2 * | 5/2004 | Koizumi et al. | 244/99.4 |
| 7,069,120 B1 | 6/2006 | Koenck et al. | |
| 7,195,209 B2 * | 3/2007 | Schievelbusch | 244/215 |
| 2004/0075022 A1 * | 4/2004 | MacKness | 244/100 R |
| 2005/0226545 A1 * | 10/2005 | Ohtsuki et al. | 384/448 |
| 2008/0100569 A1 * | 5/2008 | Lum et al. | 345/156 |
| 2009/0317027 A1 | 12/2009 | Burt et al. | |

FOREIGN PATENT DOCUMENTS

| | | |
|---|---|---|
| WO | WO 2007/074173 | 7/2007 |
| WO | WO 2008/047066 | 4/2008 |

OTHER PUBLICATIONS

Written Opinion for PCT/GB2011/050423, mailed Jun. 7, 2011.
Search Report for GB1007632.1, dated Aug. 27, 2010.

* cited by examiner

SLAT MONITORING SYSTEM

This application is the U.S. national phase of International Application No. PCT/GB2011/050423 filed 4 Mar. 2011 which designated the U.S. and claims priority to GB Patent Application Nos. 1004026.9 filed 10 Mar. 2010 and 1007632.1 filed 7 May 2010, the entire contents of each of which are hereby incorporated by reference.

INTRODUCTION

The present invention relates to a slat monitoring system and, in particular, to a system for determining whether the relative rate of deployment of all the slats extending from a leading edge of an aircraft wing is the same as a predetermined relative rate of deployment, within a defined tolerance. A method of determining whether the relative rate of deployment of all the slats extending from a leading edge of an aircraft wing is the same as a predetermined relative rate of deployment, within a defined tolerance, is also disclosed.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 is provided with an arcuate support arm or slat track 3, one end 4 of which is attached to the rear of the slat 2 and extends into the wing 1. To allow for wing bending and manufacturing tolerances, the end 4 of the slat track 3 is attached to the slat using spherical bearings and linkages (not shown). The slat track 3 penetrates wing spar 6 forming the wing structure. The slat track 3 defines an arc having an axis and is mounted within the wing so that it can rotate about that axis (in the direction indicated by arrows "A" and "B" in FIG. 1) to deploy and retract the slat 2 attached to one end of the slat track 3.

To drive the slat track 3 so as to deploy or retract the slat 2, a toothed slat track rack 7 having an arcuate shape corresponding to the arcuate shape of the slat track 3 is mounted within a recess 3a on the slat track 3 and a correspondingly toothed drive pinion 8 is in engagement with the teeth 7a on the slat track rack 7 so that when the drive pinion 8 rotates, the teeth 8a on the drive pinion 8 and the teeth 7a on the rack 7 cooperate to pivot or drive the slat rack 7 and the slat attached thereto, into a deployed position, i.e. in the direction of arrow "A" in FIG. 1. Typically, the slat track 3 rotates through an angle of 27 degrees between its fully stowed and fully deployed positions. Rotation of the pinion 8 in the opposite direction also drives the slat track 3, in the direction of arrow "B", back into its stowed position, as shown in FIG. 1.

Each drive pinion 8 is mounted on an outer shaft of a geared rotary actuator which extends concentrically over an inner input drive shaft that extends along the length of the wing within its leading edge, and which is driven by a slat deployment motor coupled to the inner input drive shaft at an inboard end of the wing. The inner input drive shaft is a common input drive shaft so that the slat deployment motor is operable to deploy all the slats of one wing together. The geared rotary actuator couples the inner input shaft to the outer output shaft so that the output shaft is driven by the inner input shaft. The rotary actuator also controls the speed of rotation of the output shaft relative to the input shaft so that the output shaft rotates approximately 200 to 300 times slower than the input shaft. A separate rotary actuator is associated with each drive pinion 8 and its accompanying slat track rack so there may be two or more geared rotary actuators per slat spaced along the length of the wing and extending concentrically over the input shaft.

It is important to ensure that all the slats are deployed together at the same rate, within a defined tolerance, so as to prevent any skewing or asymmetry incurred as a result of inconsistent slat deployment. Skewing of a slat occurs when one of a number of slat deployment mechanisms associated with the same slat fails so that the slat deploys at an angle because it is still being driven away from the leading edge of the wing at an angle by the remaining slat deployment mechanism(s) associated with that slat. Asymmetry occurs when the slats on one wing are deployed at a different rate or extent to the slats on the other wing. Asymmetry or skewing of slats can be caused as a result of, for example, a defective rotary actuator, common drive shaft or coupling between the inner shaft and an outer shaft of a rotary actuator.

The present invention seeks to provide a system for determining whether the relative rate of deployment of all the slats extending from a leading edge of an aircraft wing is the same as a predetermined relative rate of deployment so that further slat deployment can be prevented when the predetermined relative rate differs from the detected relative rate. If the detected relative rate of deployment differs from a predetermined rate, it can be assumed that skewing or asymmetric slat deployment is occurring and steps can then be taken to prevent further deployment of the slats.

SUMMARY OF THE INVENTION

According to the present invention, there is provided a system for determining whether the relative rate of deployment of all the slats extending from a leading edge of an aircraft wing and/or from the leading edge of both wings, is substantially the same as a predetermined relative rate of deployment, each slat including at least one slat deployment mechanism that includes a drive pinion drivingly coupled to each slat and a rotary actuator having an output shaft, the output shaft being driven by a common input drive shaft via the rotary actuator and being coupled to said drive pinion, the system comprising a sensor associated with each rotary actuator to generate a signal indicative of the rate of rotation of its corresponding output shaft and to supply that signal to a controller, the controller being configured to analyse the signals supplied by the sensors and to generate an alarm signal if a relative rate of rotation of all the output shafts differs from a predetermined relative rate of rotation.

Reference is made to the relative rate of deployment as being substantially the same and to the generation of an alarm signal in the event that the detected relative rate of rotation differs from a predetermined relative rate of rotation. However, it will be appreciated that small differences in the detected and predetermined relative rates of rotation are acceptable and may not trigger an alarm signal. These small differences are caused by operational and manufacturing tolerances and the system may be configured to make allowance for these to prevent inadvertent generation of an alarm signal when the difference between the detected rate and the predetermined rate is very small.

In a preferred embodiment, the sensor is either a magnetic or optical sensor. Most preferably, the sensor comprises a magnetic or optical rotary encoder.

If the rotary encoder is optical, it may comprise an encoder disc fixed to the output shaft of each rotary actuator, a light source and a detector.

In one embodiment, a portion of the encoder disc has a series of spaced light transmissive and opaque regions to permit and prevent, respectively, a beam of light emitted by the light source from reaching the detector as the disc rotates together with the output shaft on which it is fixed.

The encoder disc may have a first portion that extends radially from the output shaft and a second portion that extends in an axial direction from said first portion, spaced from said output shaft on which the disc is fixed. The axially extending portion may then be located between the light source and the detector and is the portion of the encoder disc that includes said plurality of spaced light transmissive and opaque regions to permit and prevent, respectively, a beam of light emitted in a radial direction by the light source from reaching the detector as the disc rotates together with said output shaft.

In a preferred embodiment, the light transmissive regions comprise a series of spaced openings or transparent areas in said portion of the encoder disc.

In another embodiment, a portion of the encoder disc has a series of spaced reflective and non-reflective regions and the light source and the detector comprise a unitary component configured to direct a beam of light towards said portion of the encoder disc and to detect the amount of light reflected back from said portion as the disc rotates.

The rotary encoder may comprise fixed inner and outer discs with the encoder disc located in a space between said inner and outer discs.

Preferably, the inner and outer discs include sealing elements to prevent ingress of contaminants into said space between said discs.

The inner disc may be received within the outer disc.

In one embodiment, the light source and detector are mounted to the outer disc or to both the inner and outer discs.

A spring element may extend between at least one of the inner and outer discs and the encoder disc.

In a preferred embodiment, the outer disc comprises an opening therein so that wiring for the sensor can extend from said space to the outside of the rotary actuator through said opening.

Preferably, the opening is formed in a recess in the outer disc and an encapsulating member is received in said recess to seal the opening with the wiring extending therethrough.

The controller preferably includes a comparator or signal conditioner to receive said signal from each sensor and to analyse said signals.

In a preferred embodiment, the controller is configured to stop rotation of the common input drive shaft motor to prevent further rotation of the common input drive shaft in response to the generation of an alarm signal.

The system may also include a common input drive shaft braking member, said controller being configured to actuate the common drive shaft braking member in response to the generation of an alarm signal to brake the common input drive shaft.

According to the invention, there is also provided a slat deployment mechanism comprising the system according to the invention, including a rotary actuator comprising a housing and an output shaft extending therefrom, the sensor being received within a a recess in the housing at one end of the rotary actuator so as to surround said output shaft.

Preferably, the sensor is an interference fit in the recess in the housing of the rotary actuator.

According to the invention, there is also provided a method for determining whether the relative rate of deployment of all the slats extending from a leading edge of an aircraft wing is the same as a predetermined relative rate of deployment, each slat including at least one slat deployment mechanism that includes a drive pinion drivingly coupled to each slat and a rotary actuator having an output shaft, the output shaft being driven by a common input drive shaft via the rotary actuator and being coupled to said drive pinion, the method including the step of using a sensor associated with each rotary actuator to generate a signal indicative of the rate of rotation of its corresponding output shaft and supplying that signal to a controller to analyse the signals supplied by the sensors and to generate an alarm signal if a relative rate of rotation of all the output shafts differs from a predetermined relative rate of rotation.

Preferably, the method comprises the step of generating a signal to stop rotation of the common input drive shaft in response to the generation of said alarm signal.

BRIEF DESCRIPTION OF THE DRAWINGS

Embodiments of the invention will now be described, by way of example only, with reference to FIGS. 2 to 6 of the accompanying drawings, in which.

DESCRIPTION OF THE PREFERRED EMBODIMENTS

Figure 2:
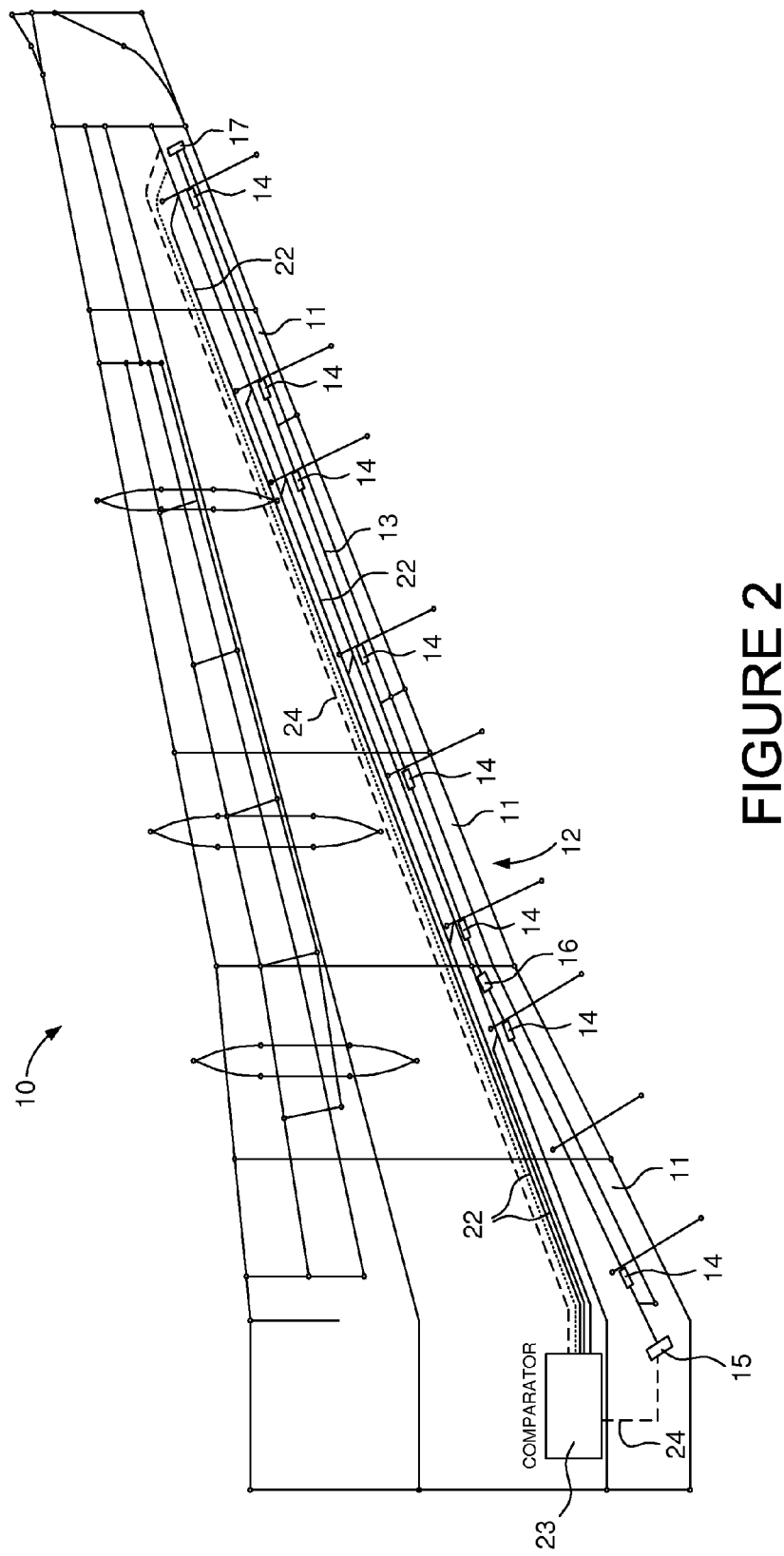
FIG. 2 shows a simplified plan view of the inside of an aircraft wing showing the apparatus of the invention including the location of the common drive shaft and rotary actuators at spaced locations along the length of the drive shaft.

Referring first to FIG. 2, there is shown a simplified plan view of the inside of an aircraft wing 10 having a plurality of slats 11 along its leading edge 12. A common input drive shaft 13 extends along the length of the wing 10 just inside its leading edge 12 and a rotary actuator 14 is positioned at spaced locations along the length of the common input drive shaft 13. Although the common input drive shaft 13 may be fabricated in sections, those sections are coupled together so that the entire input drive shaft 13 rotates as one in response to rotation of a slat deployment motor 15 located at the inboard end of the wing 1. Two sections of the common input drive shaft 13 may be coupled by a gearbox 16 to accommodate changes in the angle of the wing leading edge 12, which is mirrored by the common input drive shaft 13. Gearbox 16 therefore couples the sections together so that each section may not share the same axis of rotation.

A wingtip brake 17 may be mounted on the outboard end of the common input drive shaft 13, which is operable to stop rotation of the common input drive shaft 13, as will become apparent from the following description.

Figure 1:
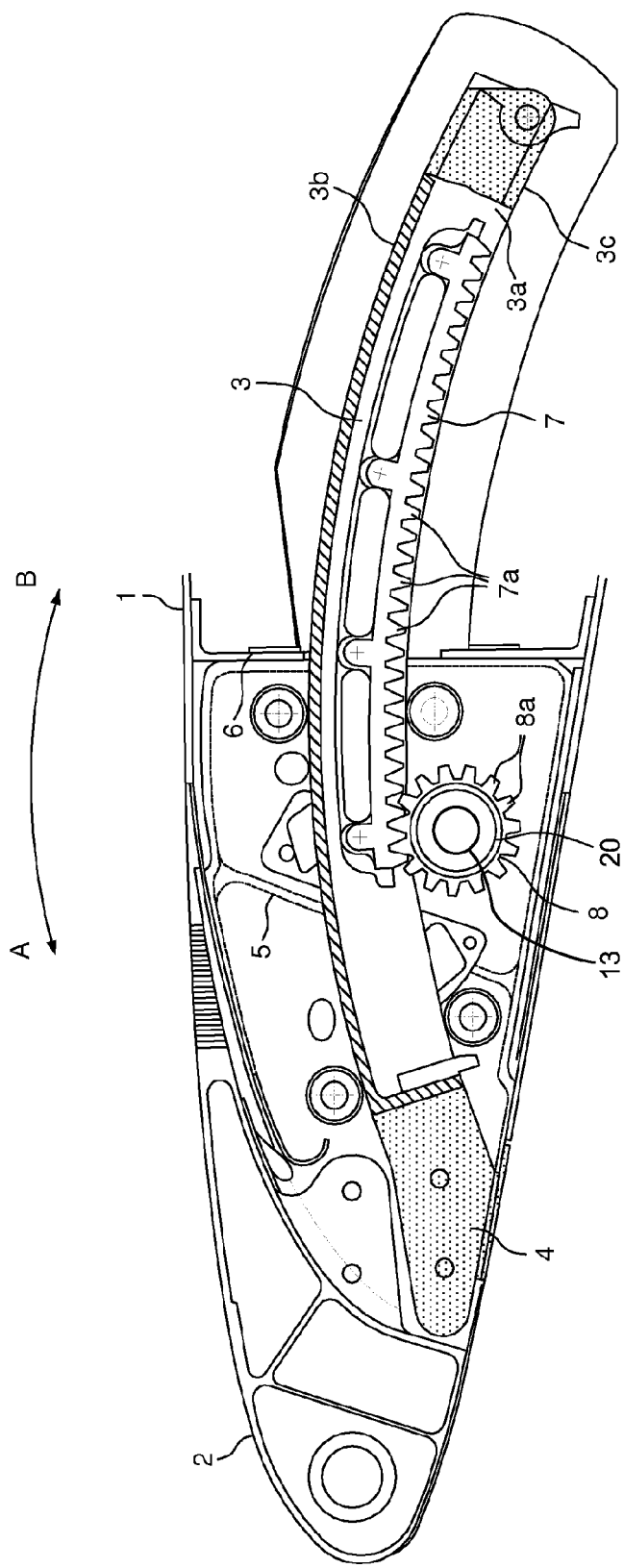
FIG. 1 is a side sectional view showing a known aircraft slat support assembly.
Figure 6:
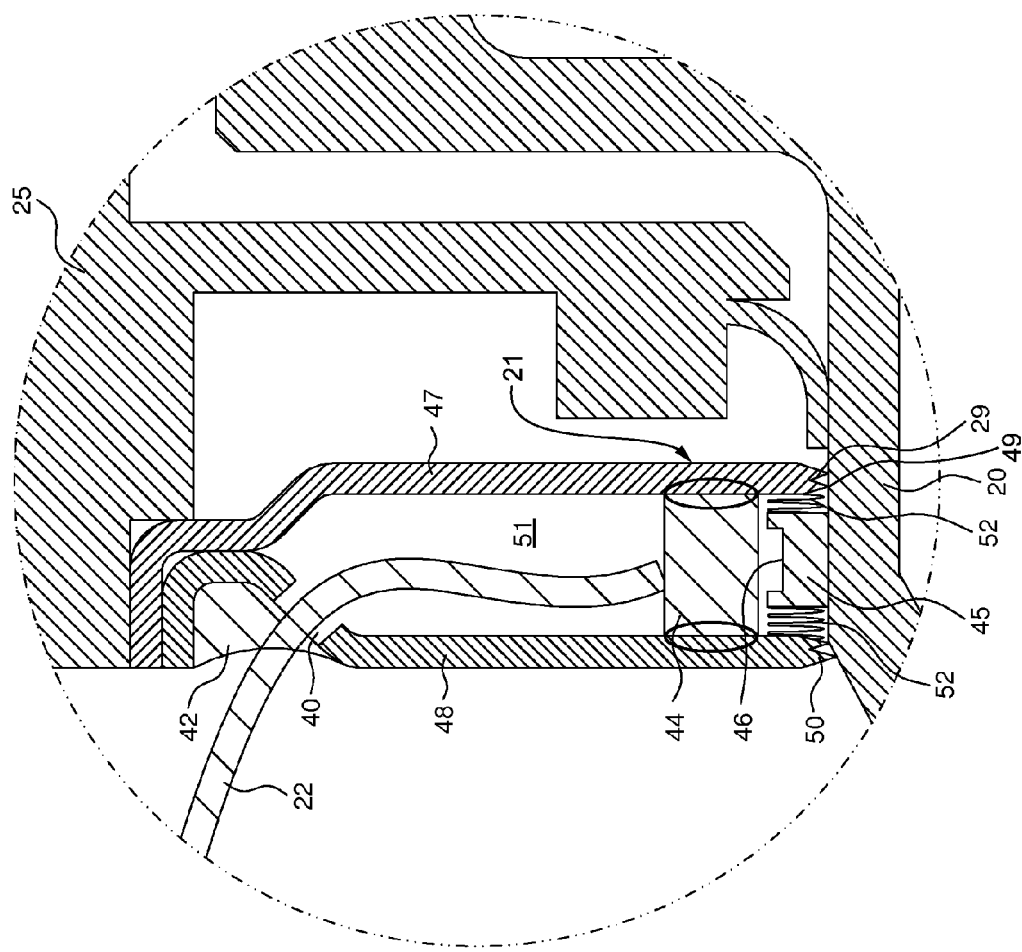
FIG. 6 shows a partial cross-section side view of a portion of the rotary encoder shown in FIG. 5, when assembled together with a rotary actuator.
Figure 7:
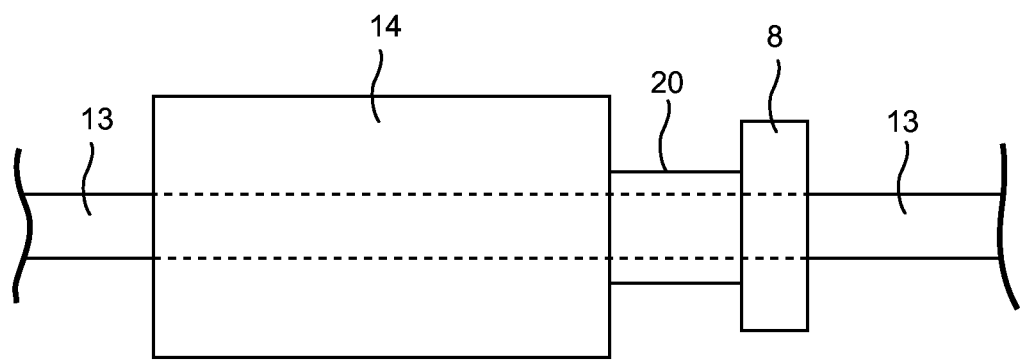
FIG. 7 shows a side view of a rotary actuator with output shaft, drive pinion and common input drive shaft.

Each of the rotary actuators 14 has a hollow output shaft 20 (see FIGS. 4 and 6) that extends concentrically over the common input drive shaft 13 as shown in FIG. 7. The output shaft 20 of each rotary actuator 14 is rotated, via the rotary actuator 14, by the common input drive shaft 13. The rotary actuator 14 fulfils the function of a gearbox to step the speed of rotation of the common drive shaft 13 down to a much slower speed of the output shaft 20, which is the required speed of rotation of the drive pinion 8 (see FIG. 1) and the slat deployment speed.

Each output shaft 20 is coupled to the drive pinion 8 (see FIG. 7), which, in turn, is geared to the slat track rack of a slat deployment mechanism so that, when the output shaft 20 rotates, the drive pinion 8 rotates to deploy the slat. Although not shown in the Figure, each output shaft 20 is provided with a gear tooth profile on its outer surface which is configured to make meshing engagement with the gear profile of the pinion 8 so that drive is transmitted between them.

As each slat normally comprises at least two slat tracks 3, there are two rotary actuators 14 to drive the pinion 8 associated with each slat track 3. However, it will be appreciated that a slat 11 may have any number of slat tracks 3 and each of those slat tracks 3 may be driven separately by its own rotary actuator 14 and associated output shaft 20, which receives its drive from the common input drive shaft 13.

Each rotary actuator 14 is provided with a sensor 21 see FIGS. 3 to 6 to detect the rate of rotation of its associated output shaft 20. The sensor 21 includes wiring 22 that extends from each rotary actuator 14 and which is connected to a comparator 23 (see FIG. 2) mounted at the inboard end of the wing 1. Signals indicative of the rate of rotation of the output shaft 20 of each rotary actuator 14 is fed via wiring 22 to the comparator 23 and the comparator 23 performs an analysis of the received signals to determine whether the relative rate of rotation of all the output shafts 20 differs from a predetermined relative rate of rotation. In the event that a positive detection is made namely that the relative rate of rotation does differ from a predetermined rate of rotation, the comparator 23 generates an alarm signal.

The alarm signal could just take the form of an audible and/or visible warning in the cockpit. However, in a more preferable embodiment, the system includes a feedback loop 24 (see FIG. 2) so the comparator 23 sends a signal to the drive motor 15 automatically in response to a positive detection. This alarm signal stops the drive motor 15 to prevent asymmetric or skewed slat deployment. The signal may also be fed to the wingtip brake 17, which immediately applies a brake to the common drive shaft 13 to prevent further rotation. Although the motor 15 also acts as a brake when it is stopped, it is preferable if the common input drive shaft 13 is restrained at both ends using a wingtip brake 17 as well, so as to immediately prevent rotation in the event that the common input drive shaft 13 has failed somewhere between its ends.

The sensor 21 of a preferred embodiment of the invention will now be described with reference to FIGS. 3 and 4. The sensor 21 is located within the end of the housing 25 of a rotary actuator 14, the housing 25 having a flange 26 having apertures 27 therein to enable it to be mounted on a structural rib (not shown) of the aircraft wing 1. Although a rotary actuator 14 may be specifically designed to receive said sensor 21, it is also envisaged that the sensor 21 of the invention may be retro-fitted to existing rotary actuators 14.

The sensor 21 comprises a rotary encoder disc 28 which is rigidly mounted on the outlet shaft 20 so that it rotates together with this shaft 20. The rotary encoder disc has a radially extending portion 29 and an axially extending portion 30. A series of spaced light transmissive regions 31 separated by opaque regions 32 are formed in the axially extending portion 30. The light transmissive regions 31 may simply be openings extending through the axially extending portion 30 of the encoder disc 28, the opaque portions 32 being formed by parts of the axially extending portion 30 between the openings.

The sensor 21 includes inner and outer discs 33, 34. Inner and outer discs 33, 34 are positioned in contact in a region of their periphery but define a space 35 therebetween to receive the rotary encoder disc 28. The inner disc 33 includes an integral seal 36 that seals against the rotary encoder disc 28, and the outer disc includes an integral seal 37 that seals against the output drive shaft 20. These seals 36, 37 protect the rotary encoder disc and prevent the ingress of dirt or contaminants into the space 35.

The space 35 also contains a light source 38 such as, for example, an LED and a detector 39. The LED 38 and the detector 39 are both fixedly mounted within the space 35 so the LED can emit a beam of light towards the detector 39. The LED 38 and the detector 39 may, for example, both be mounted to the outer disc 34 together with a printed circuit board 40 for controlling the LED 38 and the detector 39. It will be appreciated that the LED 38 and the detector 39 are positioned on either side of the axially extending portion 30 of the encoder disc 28 so that the beam of light emitted from the LED 38 in a radially outward direction will be interrupted as the encoder disc 28 rotates and the light transmissive regions 31 and opaque regions 32 pass between the detector 39 and the LED 38.

The wire 22 extends from the detector 39 through an opening 40 in the outer disc 34 and is coupled to the comparator 23. The opening 40 is formed in a recess 41 in the outer disc 34 in which is received an encapsulating ring or member 42 which seals the opening 40 with the wire 22 passing therethrough.

As a result of rotation of the output shaft 20 and the encoder disc 28 mounted thereon, the detector 39 is able to generate a signal indicative of the rate of rotation of the output shaft 20. This signal is fed back to the comparator 23 via the wire 22 to enable the comparator 23 to determine the relative rate of rotation of all the output shafts 20 and thereby determine if the detected rate of rotation differs from a predetermined rate by more than a certain tolerance and to generate an alarm signal if the result of that detection is positive.

A spring element 43 is disposed in the space 35 and acts between the outer disc and the rotary encoder disc 28. The spring element 43 assists in centralising the rotary encoder disc 28 within the space 35 between the inner and outer discs 33, 34.

Figure 3:
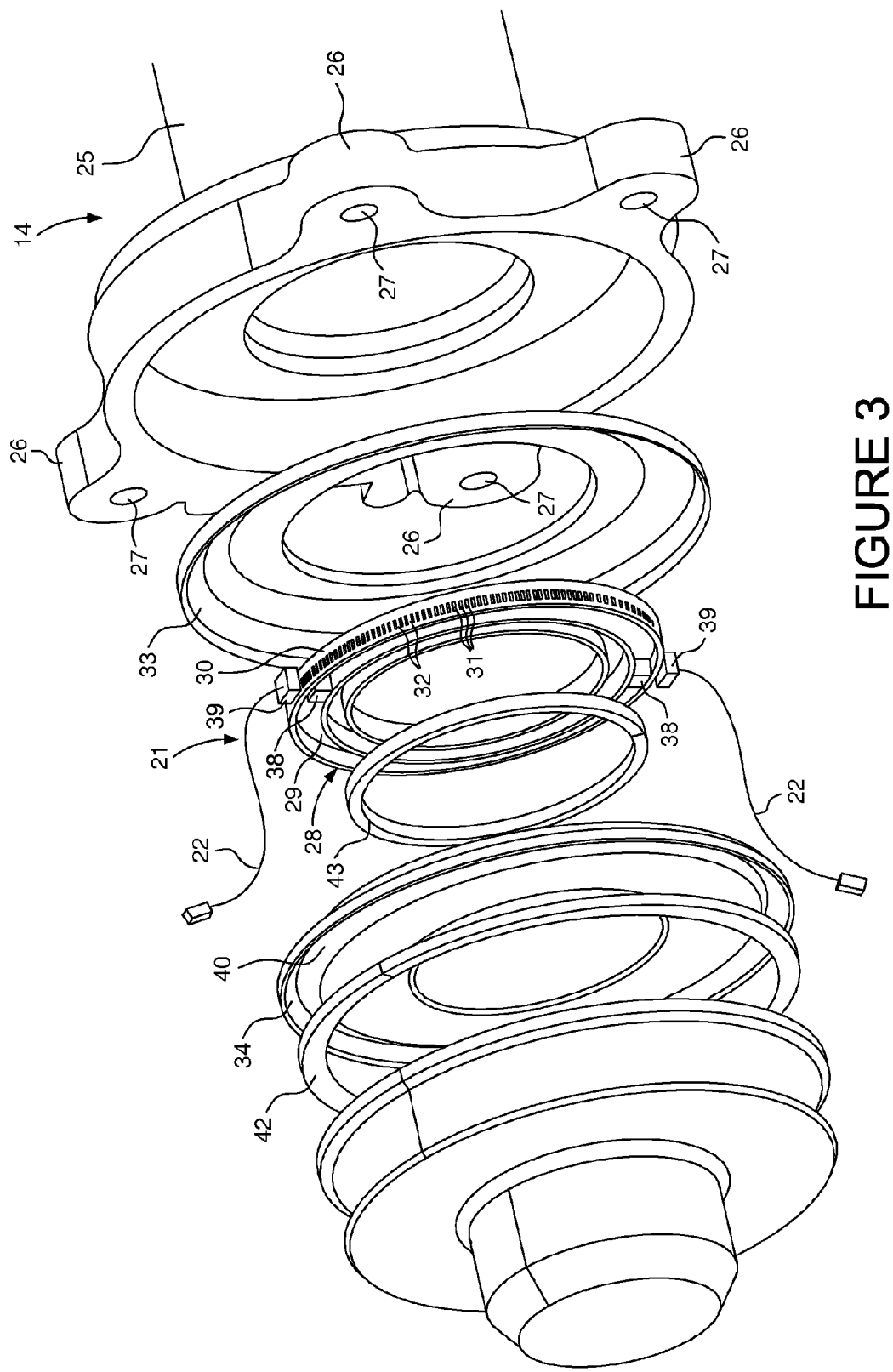
FIG. 3 shows an exploded perspective view of a rotary encoder according to a first embodiment of the present invention.
Figure 4:
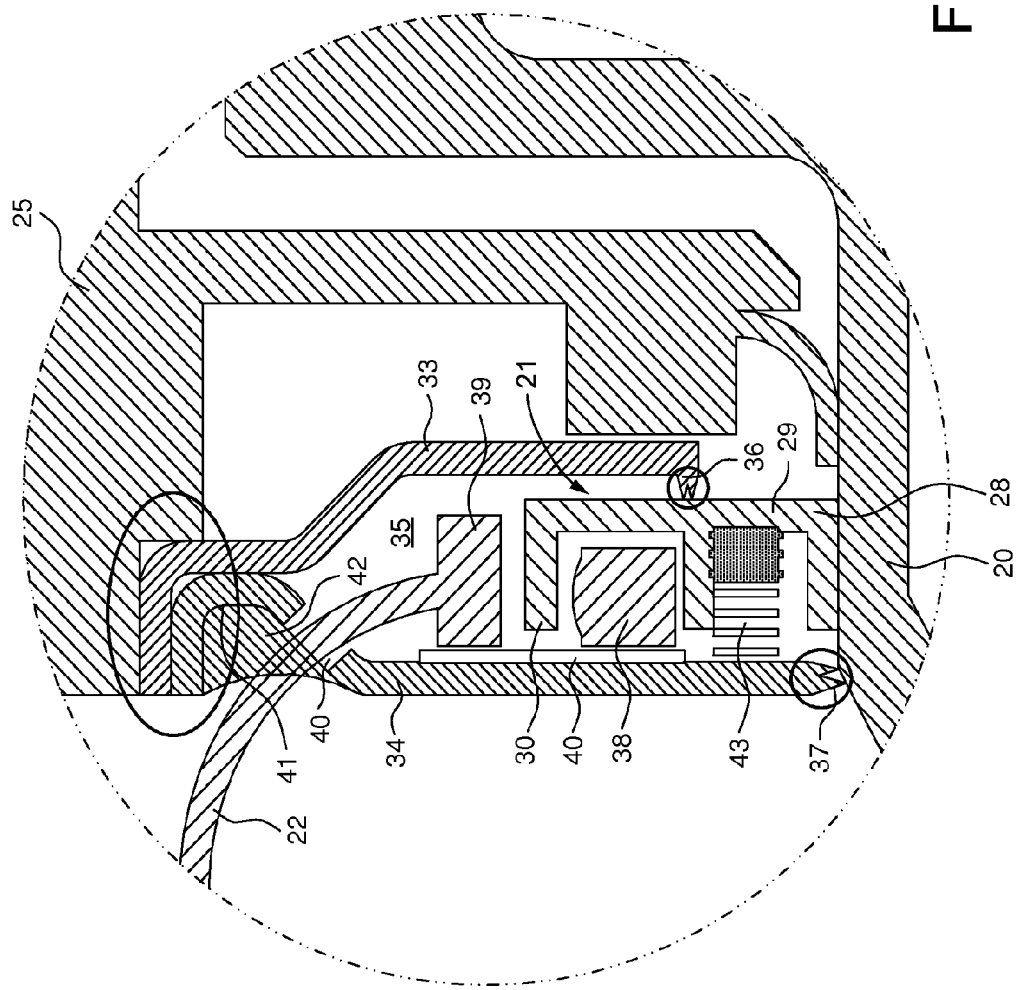
FIG. 4 shows a partial cross-sectional side view of a portion of the rotary encoder shown in FIG. 3, when assembled together with a rotary actuator.

Two LED's 38 and respective detectors 39 are shown in FIG. 3 to provide redundancy in the event that one of the LED's and/or detectors fails. It will be appreciated that any number of redundant back-up detectors and/or LED's may be provided. It is also possible that one or more of these back-ups will be dormant until a failure occurs at which point the back-up LED and detector becomes active. A similar dormant redundancy feature may be provided if a magnetic rotary encoder is employed. In either case, failure of an initial detector may trigger an alarm.

Figure 5:
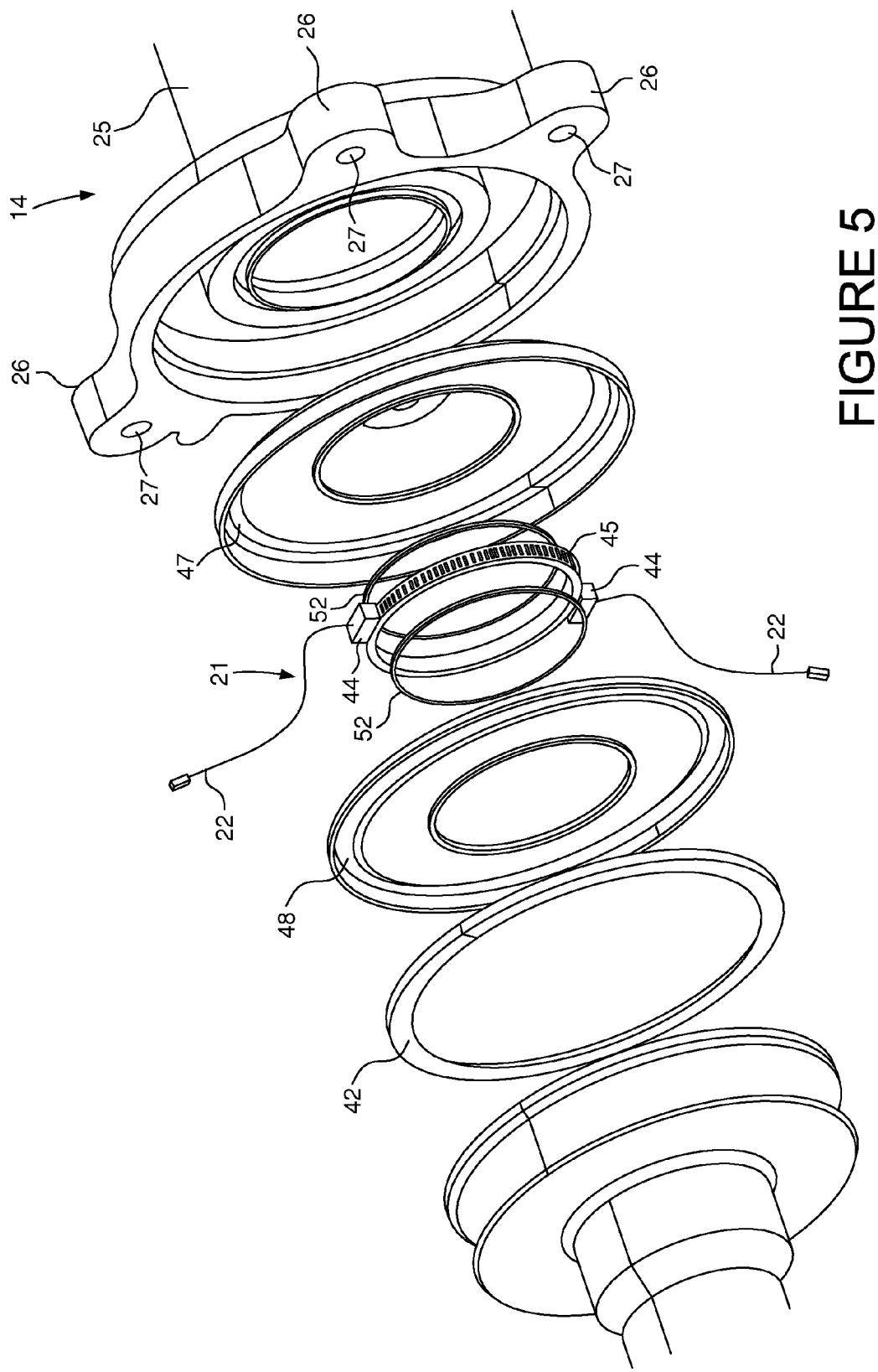
FIG. 5 shows an exploded perspective view of a rotary encoder according to a second embodiment of the present invention.

A modified embodiment is shown in FIGS. 5 and 6. This embodiment is similar to the embodiment of FIGS. 3 and 4, except that the detector and light source are combined into a single unitary component 44 located above the outer circumferential surface of a rotary encoder ring 45 fixedly mounted to the output shaft 20. In this embodiment, the outer surface 46 of the encoder ring 45 may have a series of reflective and non-reflective regions so that, when the LED 44 is operational, the detector 44 determines the amount of light reflected back from the surface 46 in order to determine the rate of rotation of the output shaft 20.

As with the previous embodiment, the sensor 21 includes inner and outer discs 47, 48 each having an integral seal 49, 50 that seals against the output shaft 20 and to define a space 51 there between in which the rotary encoder ring 45 is disposed. The detector 44 may be attached to one or both of the inner or outer discs 47,48. As with the previous embodiment, a wire 22 extends from the detector 44 to the comparator 23 through an opening 40 in the outer disc 48 which is sealed by an encapsulating member 42.

As with the previous embodiment, the sensor 21 may include multiple detectors 44 to provide redundant back-ups in the event of a failure.

A spring element 52 may be disposed between the outer disc 48 and the encoder ring 45 and between the inner disc 47 and the encoder ring 45 to centralise the rotary encoder ring 45 relative to the inner and outer discs 47,48.

It will be appreciated that the foregoing description is given by way of example only and that modifications may be made to the slat support assembly of the present invention without departing from the scope of the appended claims.

The invention claimed is:

1. A slat deployment mechanism for deploying a plurality of slats from a leading edge of an aircraft wing, the slat deployment mechanism comprising:
   at least two drive pinions drivingly coupled to each of said plurality of slats;
   at least one slat deployment motor;
   a common input drive shaft coupled to said at least two drive pinions so that operation of the slat deployment motor drives the common input drive shaft to rotate the at least two drive pinions drivingly to deploy the slats;
   at least two rotary actuators per slat, each of said at least two rotary actuators connecting said common input drive shaft to an output shaft connected to a corresponding one of said at least two drive pinions;
   at least one sensor associated with each of said at least two rotary actuators to generate signals indicative of the rate of rotation of each of said at least two output shafts; and
   a controller, configured to receive and analyse said signals from each of said at least two sensors and to generate an alarm signal in the event that the rate of rotation of said at least two output shafts differ.

2. A slat deployment mechanism according to claim 1, wherein the at least one sensor comprises a rotary encoder.

3. A slat deployment mechanism according to claim 2, wherein the rotary encoder comprises an optical rotary encoder.

4. A slat deployment mechanism according to claim 3, wherein the rotary encoder comprises an encoder disc fixed to the output shaft of each rotary actuator, a light source and a detector.

5. A slat deployment mechanism according to claim 4, wherein a portion of the encoder disc has a series of spaced light transmissive and opaque regions to permit and prevent, respectively, a beam of light emitted by the light source from reaching the detector as the encoder disc rotates together with the output shaft on which the encoder disc is fixed.

6. A system according to claim 5, wherein the encoder disc has a first portion that extends radially from the output shaft and a second portion that extends in an axial direction from said first portion, spaced from said output shaft on which the disc is fixed.

7. A slat deployment mechanism according to claim 6, wherein the axially extending portion is located between the light source and the detector and is the portion of the encoder disc that includes said plurality of spaced light transmissive and opaque regions to permit and prevent, respectively, a beam of light emitted in a radial direction by the light source from reaching the detector as the encoder disc rotates together with said output shaft.

8. A slat deployment mechanism according to claim 5, wherein the light transmissive regions comprise a series of spaced openings or transparent areas in said portion of the encoder disc.

9. A slat deployment mechanism according to claim 4, wherein a portion of the encoder disc has a series of spaced reflective and non-reflective regions and the light source and the detector comprise a unitary component configured to direct a beam of light towards said portion of the encoder disc and to detect the amount of light reflected back from said portion as the encoder disc rotates.

10. A slat deployment mechanism according to claim 4, wherein the rotary encoder comprises fixed inner and outer discs with the encoder disc located in a space between said inner and outer discs.

11. A slat deployment mechanism according to claim 10, wherein the inner and outer discs include sealing elements to prevent ingress of contaminants into said space between said inner and outer discs.

12. A slat deployment mechanism according to claim 11, wherein the inner disc is received within the outer disc.

13. A slat deployment mechanism according to claim 10, wherein the light source and the detector are mounted to the outer disc or to both the inner and outer discs.

14. A slat deployment mechanism according to claim 10, wherein a spring element extends between at least one of the inner and outer discs and the encoder disc.

15. A slat deployment mechanism according to claim 10, wherein the outer disc comprises an opening therein so that wiring for the sensor can extend from said space to the outside of the rotary actuator through said opening.

16. A slat deployment mechanism according to claim 15, wherein the opening is formed in a recess in the outer disc and an encapsulating member is received in said recess to seal the opening with the wiring extending therethrough.

17. A slat deployment mechanism according to claim 1, wherein the controller includes a comparator or signal conditioner to receive said signal from each sensor and to analyse said signals.

18. A slat deployment mechanism according to claim 1, wherein the controller is configured to stop rotation of the common input drive shaft motor to prevent further rotation of the common input drive shaft in response to the generation of said alarm signal.

19. A slat deployment mechanism according to claim 18, comprising a common input drive shaft braking member, said controller being configured to actuate the common drive shaft braking member in response to the generation of said alarm signal to brake the common input drive shaft.

20. A slat deployment mechanism according to claim 1, wherein each rotary actuator comprises a housing and the at least one sensor is received within a recess in the housing at one end of the rotary actuator so as to surround said output shaft.

21. A slat deployment mechanism according to claim 20, wherein the at least one sensor and the housing together form an interference fit.

* * * * *